US008392936B2

(12) United States Patent
Gerea et al.

(10) Patent No.: US 8,392,936 B2
(45) Date of Patent: *Mar. 5, 2013

(54) COMPLEX EVENT PROCESSING (CEP) ADAPTERS FOR CEP SYSTEMS FOR RECEIVING OBJECTS FROM A SOURCE AND OUTPUTING OBJECTS TO A SINK

(75) Inventors: Ciprian Gerea, Seattle, WA (US); Ramkumar Krishnan, Redmond, WA (US); Tomer Verona, Redmond, WA (US); Balan Sethu Raman, Redmond, WA (US); Beysim Sezgin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/360,548

(22) Filed: Jan. 27, 2012

(65) Prior Publication Data

US 2012/0131599 A1   May 24, 2012

Related U.S. Application Data

(62) Division of application No. 12/603,416, filed on Oct. 21, 2009, now Pat. No. 8,132,184.

(51) Int. Cl.
 G06F 13/00 (2006.01)
(52) U.S. Cl. ............. 719/318; 710/8; 710/52; 710/62; 710/72; 710/104
(58) Field of Classification Search .......... 719/318; 710/52, 104
See application file for complete search history.

(56) References Cited

U.S. PATENT DOCUMENTS

| | | | |
|---|---|---|---|
| 5,691,917 A | 11/1997 | Harrison | |
| 5,809,235 A | 9/1998 | Sharma et al. | |
| 6,145,009 A | 11/2000 | Miyazawa et al. | |
| 6,336,139 B1 | 1/2002 | Feridun et al. | |
| 6,449,618 B1 | 9/2002 | Blott et al. | |
| 6,925,631 B2 | 8/2005 | Golden | |
| 7,065,561 B2 | 6/2006 | Fry et al. | |
| 7,349,675 B2 | 3/2008 | Karr et al. | |
| 7,457,728 B2 | 11/2008 | Chen et al. | |
| 8,132,184 B2 * | 3/2012 | Gerea et al. ............. | 719/318 |
| 2003/0229559 A1 | 12/2003 | Panttaja et al. | |
| 2005/0055631 A1 | 3/2005 | Scardina et al. | |
| 2005/0138081 A1 | 6/2005 | Alshab et al. | |
| 2005/0165724 A1 | 7/2005 | West | |
| 2005/0182758 A1 | 8/2005 | Seitz et al. | |
| 2006/0069942 A1 | 3/2006 | Brasilerio et al. | |
| 2006/0123119 A1 | 6/2006 | Hill et al. | |
| 2006/0248182 A1 | 11/2006 | Glassco et al. | |

(Continued)

OTHER PUBLICATIONS

Jiang et al, "Estreams: Towards an Integrated Model for Event and Stream Processing", retrieved at <<http://ariana.uta.edu/research/Publications/Downloads/CSE-2004-3.pdf>>, Jul. 1, 2004. pp. 25.

(Continued)

Primary Examiner — Tammara Peyton
(74) Attorney, Agent, or Firm — Merchant & Gould P.C.

(57) ABSTRACT

Methods, systems, and computer-readable media are disclosed for implementing adapters for event processing systems. A particular system includes an input adapter configured to store event objects received from a source at an input queue. The system also includes a query engine configured to remove event objects from the input queue, to perform a query with respect to the removed event objects to generate result objects, and to insert result objects into an output queue. The system also includes an output adapter configured to remove result objects from the output queue and to transmit the result objects to a sink.

15 Claims, 5 Drawing Sheets

U.S. PATENT DOCUMENTS

| | | | |
|---|---|---|---|
| 2007/0136239 A1 | 6/2007 | Lee et al. | |
| 2007/0168990 A1 | 7/2007 | Alshab et al. | |
| 2007/0255529 A1 | 11/2007 | Biazetti et al. | |
| 2008/0072221 A1 | 3/2008 | Chkodrov et al. | |
| 2008/0109824 A1 | 5/2008 | Chen et al. | |
| 2008/0134158 A1 | 6/2008 | Salz et al. | |
| 2008/0256384 A1 | 10/2008 | Branson et al. | |
| 2008/0301135 A1 | 12/2008 | Alves et al. | |
| 2009/0052341 A1 | 2/2009 | Enqvist | |
| 2009/0070765 A1 | 3/2009 | Alves et al. | |
| 2009/0070786 A1* | 3/2009 | Alves et al. | 719/318 |
| 2009/0100029 A1 | 4/2009 | Jain et al. | |
| 2009/0125550 A1 | 5/2009 | Barga et al. | |
| 2009/0125635 A1 | 5/2009 | Barga et al. | |
| 2009/0276791 A1 | 11/2009 | Meijer | |

OTHER PUBLICATIONS

"Complex Event Processing Made Simple Using Esper", retrieved at <<http://www.theserverside.com/tt/articles/article.tss?l=ComplexEventProcessing>>, Apr. 2008.pp. 8.

Bry et al., "A High-Level Query Language for Events", retrieved at <<http://www.pms.ifi.lmu.de/mitarbeiter/eckert/publications/EDA-PS2006.pdf>>, 2006. pp. 8.

Wei et al, "ReCEPtor: Sensing Complex Events in Data Streams for Service-Oriented Architechtures", retrieved at <<http://www.hpl.hp.com/techreports/2007/HPL-2007-176.pdf>>, Nov. 2, 2007. pp. 22.

"Oracle CEP 11gR1—official support for CQL", retrieved at <<http://adcalves.wordpress.com/2009/07/01/oracle-cep-11gr1-official-support-for-cql/>>, Jul. 1, 2009. pp. 3.

Barga et al, "Consistent Streaming Through Time: A Vision for Event Stream Processing", retrieved at <<http://www.cs.cornell.edu/~mshong/papers/cidr%2007%20cedr.pdf>>, Jan. 7-10, 2007. pp. 12.

"Explicit Server Development Model", retrieved at <<http://msdn.microsoft.com/en-us/library/ee391319(SQL.105).aspx>>, pp. 3.

"SQL Server 2008 R2-Streamlight Technology", retrieved at <<http://www.microsoft.com/sqlserver/2008/en/us/R2-complex-event.aspx>>, pp. 2.

"Microsoft StreamInsight", retrieved at <<http://msdn.microsoft.com/en-us/library/ee362541(SQL.105,printer).aspx>>, pp. 1.

Grabs et al, "Introducing Microsoft's Platform for Complex Event Processing", May 2009. pp. 24.

Grabs et al, "Introducing Microsoft StreamInsight", Sep. 2009. pp. 27.

Jiang et al, "Anatomy of a Data Stream Management System", retrieved at <<http://ftp.informatik.rwth-aachen.de/Publications/CEUR-WS/Vol-215/paper12.pdf>>,2004. pp. 16.

"Complex Event Processing (CEP)", retrieved at <<http://www.progress.com/psm/apama/data-streams/index.ssp>>, Mar. 9, 2007. pp. 2.

Wu et al, "High-Performance Complex Event Processing", retrieved at <<http://www.cs.umass.edu/~yanlei/publications/sase-sigmod2006.pdf>>, 2006. pp. 12.

"Event-Driven Models and Complex Event Processing", retrieved at <<http://www.cxo.eu.com/article/Event-driven-models-and-complex-event-processing/>>, 2009. pp. 3.

Snoeren et al., "Mesh-Based Content Routing using XML", retrieved at <<http://xml.coverpages.org/SnoerenMESH-XML.pdf>>, 2001. pp. 14.

Ravindran et al., "A Resource Management Model for Dynamic, Scalable, Dependable, Real-Time Systems", retrieved at <<http://citeseerx.ist.psu.edu/viewdoc/download?doi=10.1.1.40.5779&rep=rep1&type=ps>>, Apr. 11, 2006. pp. 6.

Johnson et al, "A Heartbeat Mechanism and its Application in Gigascope", retrieved at <<http://www.vldb.org/conf/2005/papers/p1079-johnson.pdf>>, 2005. pp. 10.

Oberoi et al, "Integrating DDS and COTS Complex-Event Processing Engines", retrieved at <<http://www.omg.org/news/meetings/workshops/RT-2007/04-5_Oberoi_etal-revised.pdf>>, Jul. 2007. pp. 42.

Srivastava et al., "Flexible Time Management in Data Stream Systems", retrieved at <<http://infolab.stanford.edu/~usriv/papers/time.pdf>>, PODS 2004 Jun. 14-16, 2004, Paris, France. pp. 11.

Turchin et al., "Tuning Complex Event Processing Rules using the Prediction Correction Paradigm", "http://iew3.technion.ac.il/~avigal/trp.pdf," Processings of the Third ACM International Conference on Distributed Event-Based Systems, Jul. 6-9, 2009, pp. 1-12.

Suntinger et al., "The Event Tunnel: Interactive Visualization of Complex Event Streams for Business Process Pattern Analysis," "http://ieeexplore.org/stamp.jsp?amumber=04475466," IEEE Pacific Visualization Symposium 2008, Mar. 4-7, Japan, pp. 111-118.

United States Non-Final Office Action mailed Jun. 20, 2011, in U.S. Appl. No. 12/603,416 (7 pages).

United States Response to Jun. 20, 2011 action, filed Sep. 20, 2011, in U.S. Appl. No. 12/603,416 (8 pages).

United States Notice of Allowance mailed Oct. 21, 2011, in U.S. Appl. No. 12/603,416 (8 pages).

* cited by examiner

COMPLEX EVENT PROCESSING (CEP) ADAPTERS FOR CEP SYSTEMS FOR RECEIVING OBJECTS FROM A SOURCE AND OUTPUTING OBJECTS TO A SINK

CROSS-REFERENCE TO RELATED APPLICATIONS

This application is a divisional application and claims priority to U.S. patent application Ser. No. 12/603,416, (now U.S. Pat. No. 8,132,184), filed Oct. 21, 2009, entitled "COMPLEX EVENT PROCESSING (CEP) ADAPTERS FOR CEP SYSTEMS FOR RECEIVING OBJECTS FROM A SOURCE AND OUTPUTING OBJECTS TO A SINK" which application is incorporated herein by reference in its entirety.

BACKGROUND

The event-based computation paradigm has grown in importance for enterprises. For example, many business applications and system control applications can be developed based on the event-based computation paradigm. Generally, event processing applications receive events, analyze the events, and output results (e.g., proposed actions) based on the analysis of the events.

Many event processing applications have adapters at either end of a data flow stream to handle the task of receiving and transmitting data. Adapters may be user-defined or system-defined (e.g., defined by a software vendor associated with the event processing system). System-defined adapters may not be robust enough to handle the various speeds and conditions associated with data streams. On the other hand, developing a robust user-defined adapter to handle data streams may be a tedious task for information technology (IT) specialists.

SUMMARY

The present disclosure describes adapters for event processing systems. For example, queue-based processing functionality may be provided by adapters (e.g., user-defined input and output adapters) developed in accordance with a factory design pattern adapter framework. Generally, adapters may provide data transformation and handling functionality for data flowing into and out of an event processing system. Because such input and output adapters are based on a common vendor-provided adapter framework, users may define conversion logic for the input and output adapters while relying on the vendor-provided framework to provide handling of different stream conditions, including finite streams, continuous streams, steady flow streams, random intermittent flow streams, and random bursty flow streams. Thus, adapter creation and deployment may be simplified. The input and output adapters may also be configured to automatically suspend processing of objects when no new event objects are being received or when result objects are being transmitted, to conserve processing resources at an event processing system that includes the input and output adapters. The adapters may further be configured to execute declarative queries or portions thereof (e.g., for filtering purposes), thereby simplifying processing at a query engine coupled to the adapters.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

In a particular embodiment, a computer system is disclosed that includes a processor and a memory coupled to the processor. A first interface of the computer system is configured to receive an event object from a source. A second interface of the computer system is configured to transmit a result object to a sink. The processor is configured to retrieve and execute instructions from the memory. The instructions are configured to insert the event object into an input queue when the input queue is not full and to stop receipt of event objects at the first interface when the input queue is full. The instructions are also configured to execute at least one declarative complex event processing (CEP) query with respect to the event object to generate the result object. The instructions are further configured to insert the result object into an output queue. The instructions are configured to remove the result object from the output queue and to transmit the result object to the sink via the second interface.

In another particular embodiment, a computer-implemented method of operating a complex event processing (CEP) adapter is disclosed. The method includes receiving a start message at the CEP adapter and executing a running state at the CEP adapter in response to the start message. The method also includes receiving an event object from a source during execution of the running state. The method further includes attempting to execute a queue operation with respect to the event object. The method includes remaining in the running state when the queue operation is successful and entering a suspended state when the queue operation is unsuccessful. The CEP adapter is configured to not perform the queue operation during the suspended state. The method also includes receiving a resume message while in the suspended state and terminating the suspended state and re-executing the running state in response to the resume message.

In another particular embodiment, a CEP system is disclosed that includes a CEP input adapter, a CEP query engine, and a CEP output adapter. The CEP input adapter is configured to store event objects received from a source at an input queue. The CEP query engine is configured to remove event objects from the input queue, to perform a declarative CEP query with respect to the removed event objects to generate result objects, and insert result objects into an output queue. The CEP output adapter is configured to remove result objects from the output queue and to transmit the retrieved result objects to a sink. It should be noted that CEP systems may include any number of input and output adapters.

Figure 1:
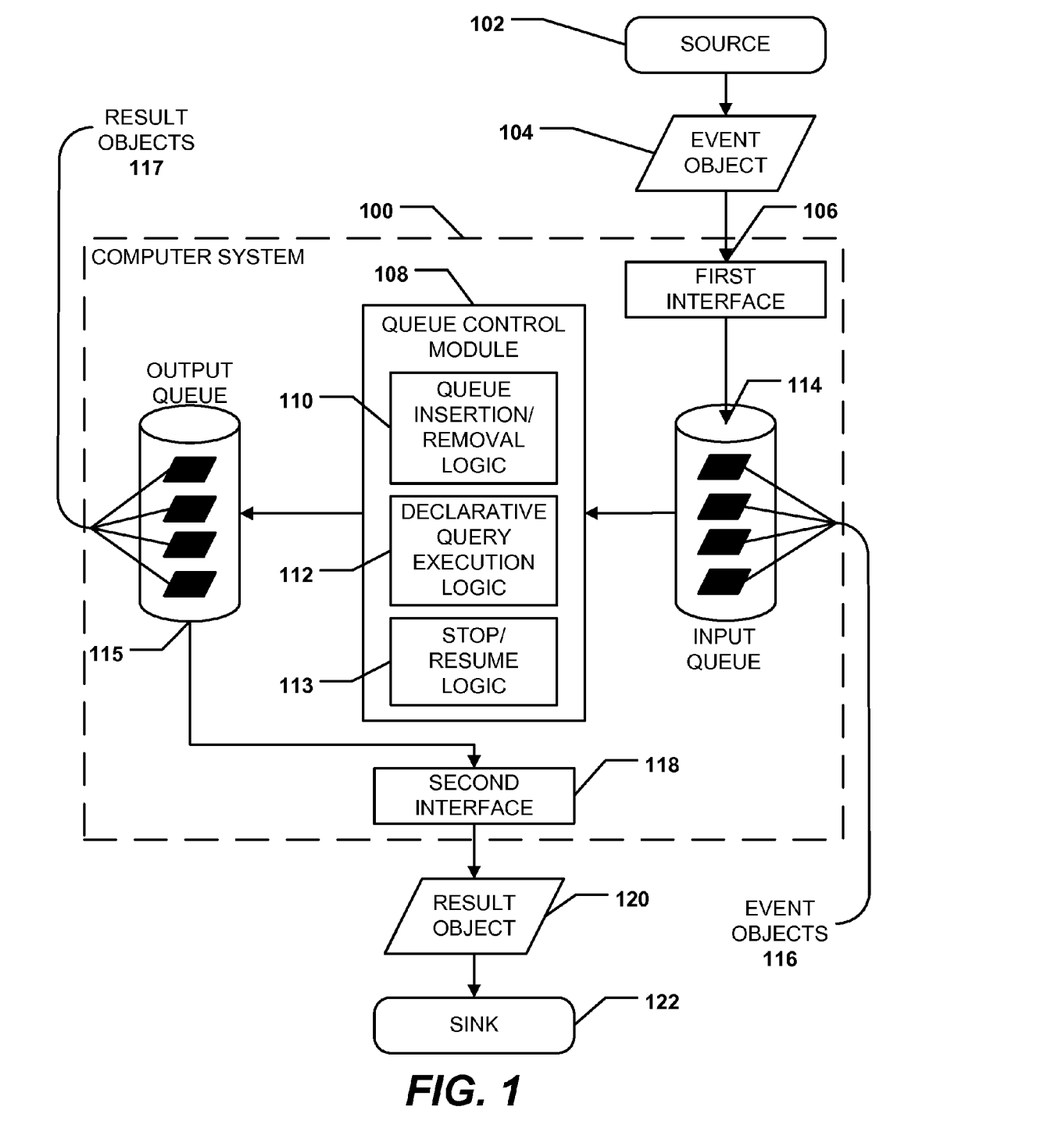
FIG. 1 is a block diagram to illustrate a particular embodiment of a computer system that performs queue-based processing of event objects.

FIG. 1 is a block diagram to illustrate a particular embodiment of a computer system 100 that performs queue-based processing of event objects. The computer system 100 is configured to receive event objects (e.g., an illustrative event object 104) from a source 102 via a first interface 106 and to transmit result objects (e.g., an illustrative result object 120) to a sink 122 via a second interface 118. The computer system 100 includes an input queue 114, an output queue 115, and a queue control module 108 configured to perform queue control operations with respect to the queues 114-115. Generally, the computer system 100 may provide queue control with respect to event objects received from the source 102 and result objects transmitted to the sink 122. The computer system 100 may be included in a complex event processing (CEP) system.

The first interface 106 at the computer system 100 is configured to receive event objects, such as the event object 104, from the source 102. The second interface 118 at the computer system 100 is configured to transmit result objects, such as the result object 120, to the sink 122. In a particular embodiment, the first interface 106 and the second interface 118 are network interfaces, such as a wired interface (e.g., Ethernet), a wireless interface (e.g., IEEE 802.11 a/b/g/n), or some other network interface. In another particular embodiment, the first interface 106 and the second interface 118 are part of a communications stack that includes logic (e.g., in the form of an input adapter and an output adapter, respectively) to convert event objects and result objects to and from an object format that is native to the computer system 100.

The queue control module 108 is configured to provide queue-based processing of event objects and result objects at the computer system 100. For example, the queue control module 108 may be executed by one or more processors at the computer system 100. The queue control module 108 includes logic 110 to remove event objects 116 from the input queue 114 when the input queue 114 is not empty. For example, the logic 110 may remove (e.g., dequeue) the event object 104 from the front of the input queue 114. The logic 110 may enqueue result objects 117 to the output queue 115 in a similar fashion.

The queue control module 108 also includes logic 112 configured to execute a declarative CEP query on one or more of the event objects 116 to generate the result objects 117. Generally, declarative programming languages indicate "what" is to be done (e.g., what particular inputs will be provided and what particular outputs will be generated) rather than "how" it is done (e.g., the underlying algebra functions to convert the inputs into the outputs). Thus, it may be easier for users to specify declarative queries as compared to non-declarative queries, because the event-level implementation details of declarative queries may not influence the result of declarative queries. For example, a declarative CEP query may include one or more relational algebra operators (e.g., projection, selection, join, aggregate, and group), and the logic 112 may automatically remove event objects from the input queue 114 that do not satisfy the declarative CEP query.

The queue control module 108 further includes logic 113 to stop or resume queue-based processing of event objects and result objects at the computer system 100. For example, an input adapter at the first interface 106 may detect that a batch execution (e.g., based on an input file) has completed. As another example, the logic 113 may detect that a user or administrator of the system 100 has manually stopped execution of the CEP query. In response, the logic 113 may stop receipt of event objects at the first interface 106 and may stop transmission of result objects at the second interface 118. In a particular embodiment, remaining event objects 116 in the input queue 114 and remaining result objects 117 in the output queue 115 are processed (e.g., "flushed") before the first interface 106 and the second interface 118 are stopped.

In operation, the event object 104 may be received from the source 102 via the first interface 106 and may be inserted into the input queue 114. As additional event objects (e.g., one or more of the event objects 116) are enqueued and dequeued, the event object 104 may travel from the back of the input queue 114 to the front of the input queue 114. When the event object 104 is at the front of the input queue 114, the logic 110 may remove the event object 104 from the input queue 114 and the logic 112 may execute a declarative CEP query with respect to the event object 104 to generate the result object 120. The logic 110 may insert the result object 120 into the output queue 115. As additional result objects (e.g., one or more of the result objects 117) are enqueued and dequeued, the result object 120 may travel from the back of the output queue 115 to the front of the output queue 115. When the result object is at the front of the output queue 115, the result object 120 may be removed from the output queue 115 and may be transmitted to the sink 122 via the second interface 118.

It should be noted that in a particular embodiment, the order of operations as described herein may be modified. For example, the logic 112 may provide a pre-enqueue filter instead of a post-enqueue filter. That is, the logic 112 may execute a filtering query (e.g., to check compliance with a threshold condition that includes at least one relational algebra operator) with respect to a particular event object and the particular event object may be inserted into the input queue 114 only when the particular event object satisfies the filtering query.

It will be appreciated that the computer system 100 of FIG. 1 may enable structured queue-based processing of event objects, including the execution of declarative queries.

Figure 2:
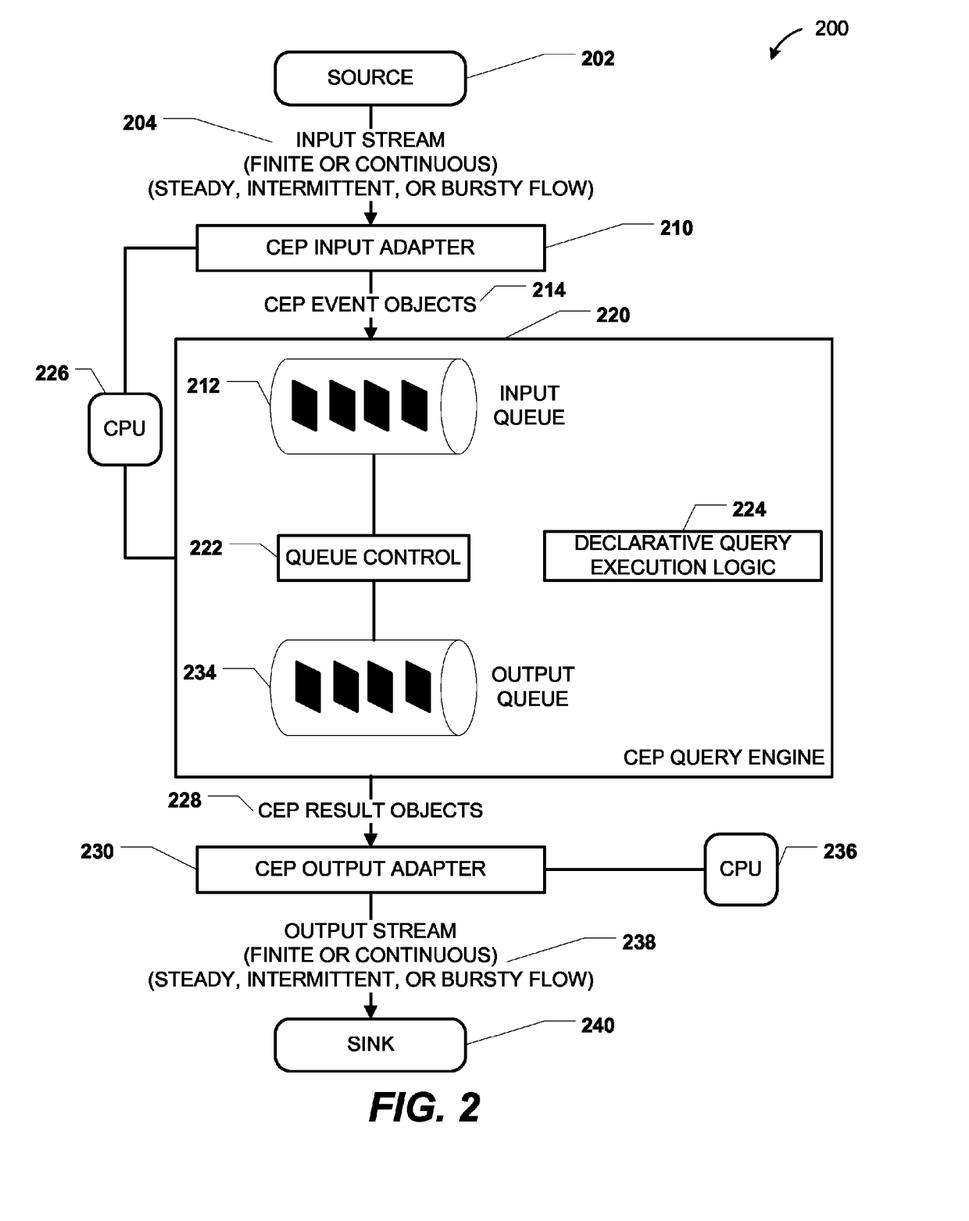
FIG. 2 is a block diagram to illustrate a particular embodiment of a complex event processing (CEP) system including adapters.

FIG. 2 is a block diagram to illustrate a particular embodiment of a CEP system 200 including adapters. The CEP system 200 includes a CEP query engine 220 communicatively coupled to a CEP input adapter 210 and to a CEP output adapter 230. The CEP input adapter 210 is also communicatively coupled to receive an input stream 204 from a source 202. The CEP output adapter 230 is also communicatively coupled to provide an output stream 238 a sink 240.

It should be noted that although in the particular embodiment illustrated in FIG. 2 the CEP query engine 220 and the CEP input adapter 210 share a processor 226 and the CEP output adapter 230 executes on a different processor 236, such processors are shown for illustrative purposes only. The CEP system 200 may include any number of processors. It should further be noted that although the particular embodiment illustrated in FIG. 2 includes one CEP input adapter 210 and one CEP output adapter 230, CEP systems may include any number of CEP input adapters and CEP output adapters.

The CEP input adapter 210 may receive CEP event objects from the source 202 via the input stream 204. The input stream 204 may be finite (e.g., when the source 202 is known to produce a predetermined number of event objects) or infinite (e.g., when the source 202 is known to continuously produce event objects, as in the case of a stock price ticker feed). The input stream 204 may also be characterized by steady flow (e.g., data from records or files), random intermittent flow (e.g., data from retail barcode scanners at a particular point-of-sale), or random bursty flow (e.g., data based on user-clicks at a website or on weather telemetry information). The CEP input adapter 210 may enqueue event objects 214 to an input queue 212 at the CEP query engine 220 and a queue control module 222 at the CEP query engine 220 may dequeue CEP event objects 214 from the input queue 212. In a particular embodiment, a declarative CEP filtering query may be performed by the CEP query engine 220 to determine whether or not to keep the dequeued CEP event objects. In another particular embodiment, the CEP input adapter 210 converts the CEP event objects 214 from a first data format (e.g., a proprietary data format) native to the source 202 to a second data format native to the CEP system 200.

When event objects 214 are dequeued at the CEP query engine 220, the logic 224 may execute one or more declarative CEP queries with respect to the event objects 214 to produce CEP result objects 228. For example, each of the one or more declarative CEP queries may include any number of relational algebra operators that operate on one or more of event payloads, event validity start times, and event validity end times of the CEP event objects 214. The CEP result objects 228 may be enqueued by the queue control module 222 to an output queue 234.

The CEP output adapter 230 may dequeue the CEP result objects 228 from the output queue 234. In a particular embodiment, the CEP output adapter 230 may convert the dequeued CEP result objects 228 from the second data format native to the CEP system 200 to a third data format (e.g., another proprietary format) native to the sink 240. The CEP output adapter 230 may transmit the CEP result objects 228 to the sink 240 via the output stream 238. Similar to the input stream 204, the output stream 238 may be finite or continuous and may be characterized by steady flow, random intermittent flow, or bursty flow.

In a particular embodiment, the CEP input adapter 210 and the CEP output adapter 230 are user-defined adapter instances generated in accordance with a factory-based design pattern to facilitate resource sharing between adapters. For example, an input adapter factory container class and an output adapter factory container class may include state common to input adapters and output adapters, respectively. In a particular embodiment, the adapter factory container classes support multiple event models (e.g., a point event model, an interval event model, and an edge event model). In another particular embodiment, the input adapter factory and the output adapter factory may provide startup and shutdown logic for input adapters and output adapters, respectively. In a particular embodiment, the CEP system 200 supports user-defined adapters via configuration schemes (e.g., data structures) that are extensible markup language (XML) serializable.

In operation, the CEP system 200 may execute CEP queries with respect to event objects to produce result objects, including performing queue-based processing techniques as described herein at the CEP input adapter 210 and at the CEP output adapter 230. For example, a particular CEP event object indicating that the stock price for Microsoft Corp. is $20.33 at 9:30 am on Jan. 2, 2009 may be received from the source 202 (e.g., a stock price ticker feed), translated into a data format native to the CEP system 200, and inserted into the input queue 212.

At the CEP query engine 220, the particular event object may be removed from the input queue 212 and the logic 224 may execute a declarative CEP query with respect to the particular CEP event object. For example, the declarative CEP query may determine whether the particular CEP event object represents a stock included in the Dow Jones Industrial Average (DJIA), and if so, may compute a custom-weighted version of the DJIA (e.g., a version where technology stocks are given greater weight than food stocks). Executing the declarative CEP query may generate a particular CEP result object that is inserted into the output queue 224. At the CEP output adapter 230, the particular CEP result object may be retrieved from the output queue 234 and translated from the format native to the CEP system to a format native to the sink 240. The particular CEP result object may then be transmitted to the sink 240 (e.g., an automated financial trading application that uses the custom-weighted version of the DJIA).

It will be appreciated that in a particular embodiment, filtering portions of the CEP query in the above example (e.g., the filtering operators that determined whether or not the particular event object represented a DJIA-listed stock) may be moved from the logic 224 to the CEP input adapter 210. It will thus be appreciated that the CEP system 200 may enable the simplification of processing at the logic 224 by offloading certain operations (e.g., filtering operations) to the CEP input adapter 210. It will also be appreciated that in a particular embodiment, the CEP system 200 of FIG. 2 may process event objects, including executing complex queries with respect to the event objects, at speeds of hundreds of thousands of objects per second, or more.

Figure 3:
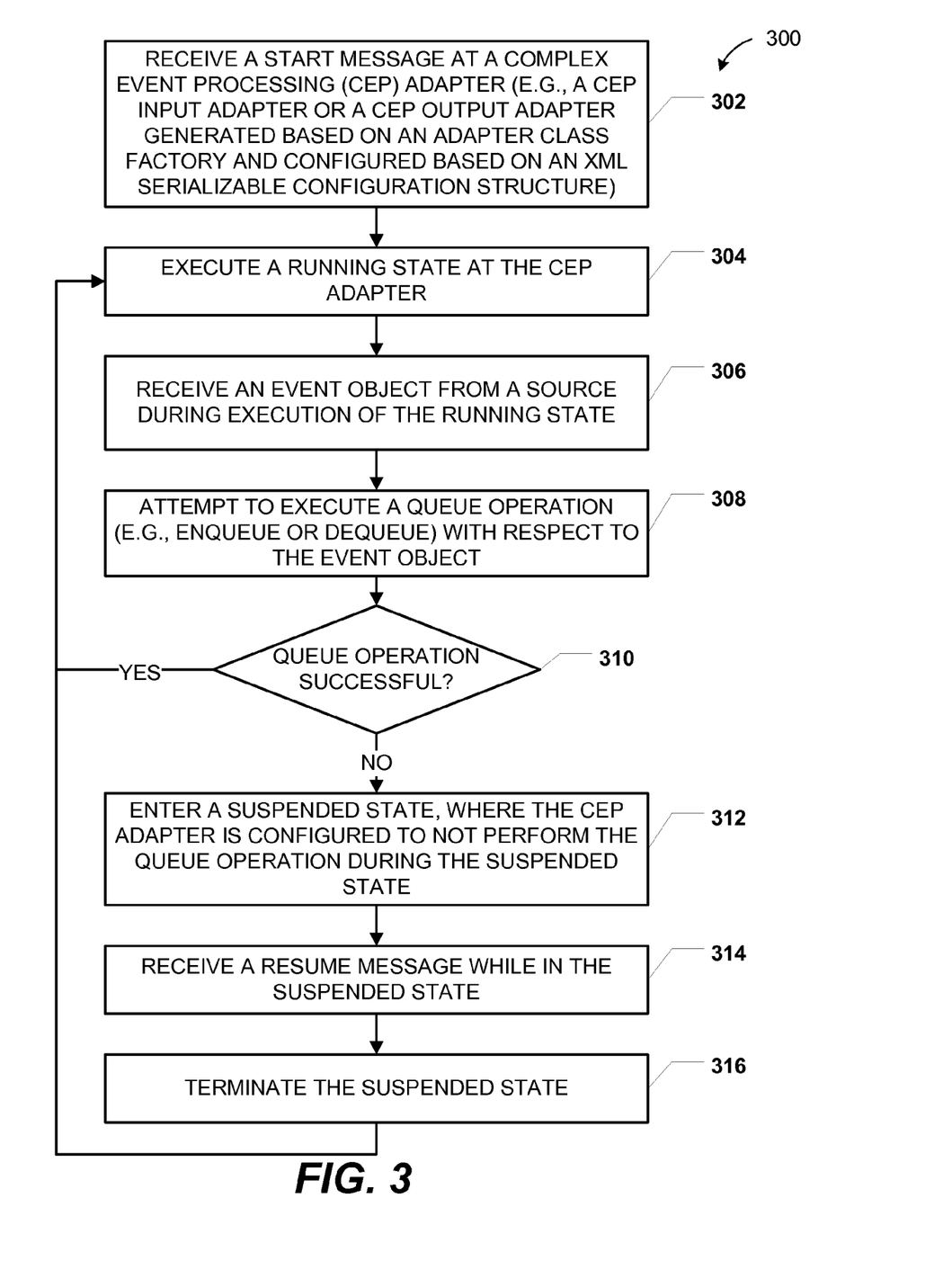
FIG. 3 is a flow diagram to illustrate a particular embodiment of a method of operating a complex event processing (CEP) adapter.

FIG. 3 is a flow diagram to illustrate a particular embodiment of a method 300 of operating a complex event processing (CEP) adapter. In an illustrative embodiment, the method 300 may be performed at the computer system 100 of FIG. 1, the CEP input adapter 210 of FIG. 2, or the CEP output adapter 230 of FIG. 2.

The method 300 includes receiving a start message at a CEP adapter, at 302. The CEP adapter may be a CEP input adapter or a CEP output adapter generated based on an adapter class factory and configured based on an XML serializable configuration scheme (e.g., data structure). For example, in FIG. 2, receipt of CEP event objects at the CEP input adapter 210 may be started. As another example, in FIG. 2, transmission of CEP result objects at the CEP output adapter 230 may be started.

The method 300 also includes executing a running state at the CEP adapter, at 304. For example, in FIG. 2, the CEP input adapter 210 may execute a running state during which event objects are received from the source 202. As another example, in FIG. 2, the CEP output adapter 230 may execute a running state during which result objects are transmitted to the sink 240.

The method 300 further includes receiving an event object from a source during execution of the running state, at 306. For example, in FIG. 2, the CEP input adapter 210 may receive an event object from the source 202. As another example, the CEP output adapter 230 may receive a result object from the CEP query engine 220 that serves as an object source for the CEP output adapter 230. Thus, it will be appreciated that although the method 300 of FIG. 3 is explained in terms of event objects, the method 300 may also be executed with respect to result objects.

The method 300 includes attempting to execute a queue operation with respect to the event object, at 308. The queue operation may be an enqueue operation or a dequeue operation. For example, in FIG. 2, the CEP input adapter 210 may attempt to enqueue the event object into the input queue 212 or the CEP query engine 220 may attempt to dequeue the event object from the input queue 212. As another example, in FIG. 2, the CEP query engine 220 may attempt to enqueue the result object into the output queue 234 or the CEP output adapter 230 may attempt to dequeue the result object from the output queue 234.

The method 300 also includes determining whether the queue operation is successful, at 310. For example, in FIG. 2, the queue control module 222 may determine whether the enqueue or dequeue operation on the input queue 212 is successful. As another example, in FIG. 2, the queue control module 222 may determine whether the enqueue or dequeue operation on the output queue 234 is successful.

When it is determined that the queue operation was successful, the method 300 includes returning to 304 and continuing execution of the running state. For example, in FIG. 2, the CEP input adapter 210 may continue execution of the running state and receive further event objects. As another example, in FIG. 2, the CEP output adapter 230 may continue execution of the running state and transmit further result objects.

When it is determined that the queue operation was not successful, the method 300 includes entering a suspended state, where the CEP adapter is configured to not perform the queue operation during the suspended state, at 312. For example, in FIG. 2, the CEP input adapter 210 may enter a suspended state during which the queue control module 222 does not perform dequeue operations on the input queue 212. As another example, in FIG. 2, the CEP output adapter 230 may enter a suspended state during which the queue control module 222 does not perform enqueue operations on the output queue 234.

The method 300 further includes receiving a resume message while in the suspended state, at 314, terminating the suspended state, at 316, and re-executing the running state at the CEP adapter, by returning to 304. For example, in FIG. 2, the CEP input adapter 210 may receive a resume message, may terminate the suspended state, and may re-execute the running state to receive further event objects. As another example in FIG. 2, the CEP output adapter 230 may receive a resume message, may terminate the suspended state, and may re-execute the running state to transmit further result objects.

It will be appreciated that CEP adapters performing the method 300 of FIG. 3 may transition from a running state to a suspended state when queue-based processing provided by the CEP adapters is not needed and may transition from the suspended state to the running state when the queue-based processing is needed. It will thus be appreciated that the method 300 of FIG. 3 may enable efficient allocation of processing resources at a CEP system.

Figure 4:
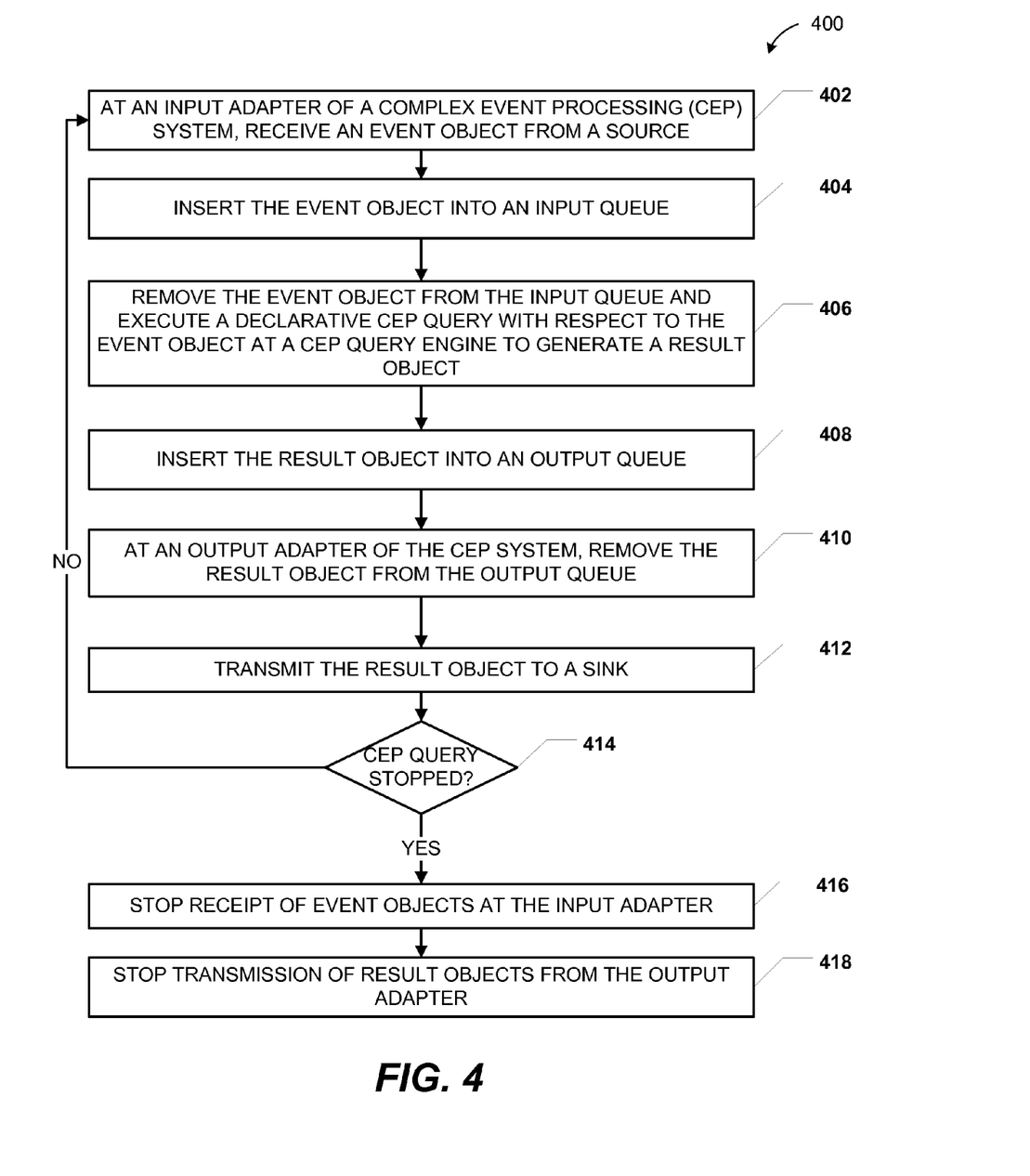
FIG. 4 is a flow diagram to illustrate a particular embodiment of a method of operating a CEP system to perform queue-based processing of event objects and result objects.

FIG. 4 is a flow diagram to illustrate a particular embodiment of a method 400 of operating a CEP system to perform queue-based processing of event objects and result objects. In an illustrative embodiment, the method 400 may be performed by the CEP system 200 of FIG. 2.

The method 400 includes receiving an event object from a source at an input adapter of a CEP system, at 402. For example, referring to FIG. 2, an event object may be received from the source 202 at the CEP input adapter 210.

The method 400 also includes inserting the event object into an input queue, at 404. For example, referring to FIG. 2, the event object may be inserted into the input queue 212.

The method 400 further includes removing the event object from the input queue and executing a declarative CEP query with respect to the event object to generate a result object, at 406. For example, referring to FIG. 2, the event object may be removed from the input queue 212 and the logic 224 may execute a declarative CEP query with respect to the event object to generate a result object.

The method 400 includes inserting the result object into an output queue, at 408. For example, referring to FIG. 2, the result object may be inserted into the output queue 234.

The method 400 also includes, at an output adapter of the CEP system, removing the result object from the output queue, at 410, and transmitting the result object to a sink, at 412. For example, referring to FIG. 2, the CEP output adapter 230 may remove the result object from the output queue 234 and may transmit the result object to the sink 240.

The method 400 further includes determining whether the CEP query has stopped, at 414. A CEP query may stop due to the termination of a batch execution, due to a manual stoppage of the CEP query by an administrator, or for some other reason. For example, referring to FIG. 2, the CEP query engine 220 may determine that the CEP query has stopped.

When it is determined that the CEP query has not stopped, the method 400 returns to 402. When it is determined that the CEP query has stopped, the method 400 includes stopping receipt of event objects at the input adapter, at 416. For example, referring to FIG. 2, receipt of event objects at the CEP input adapter 210 may be stopped.

The method 400 also includes stopping transmission of result objects from the output adapter, at 418. For example, referring to FIG. 2, the transmission of result objects from the CEP output adapter 230 may be stopped once any queued result objects in the output queue 234 have been transmitted and the output queue 234 is empty.

Figure 5:
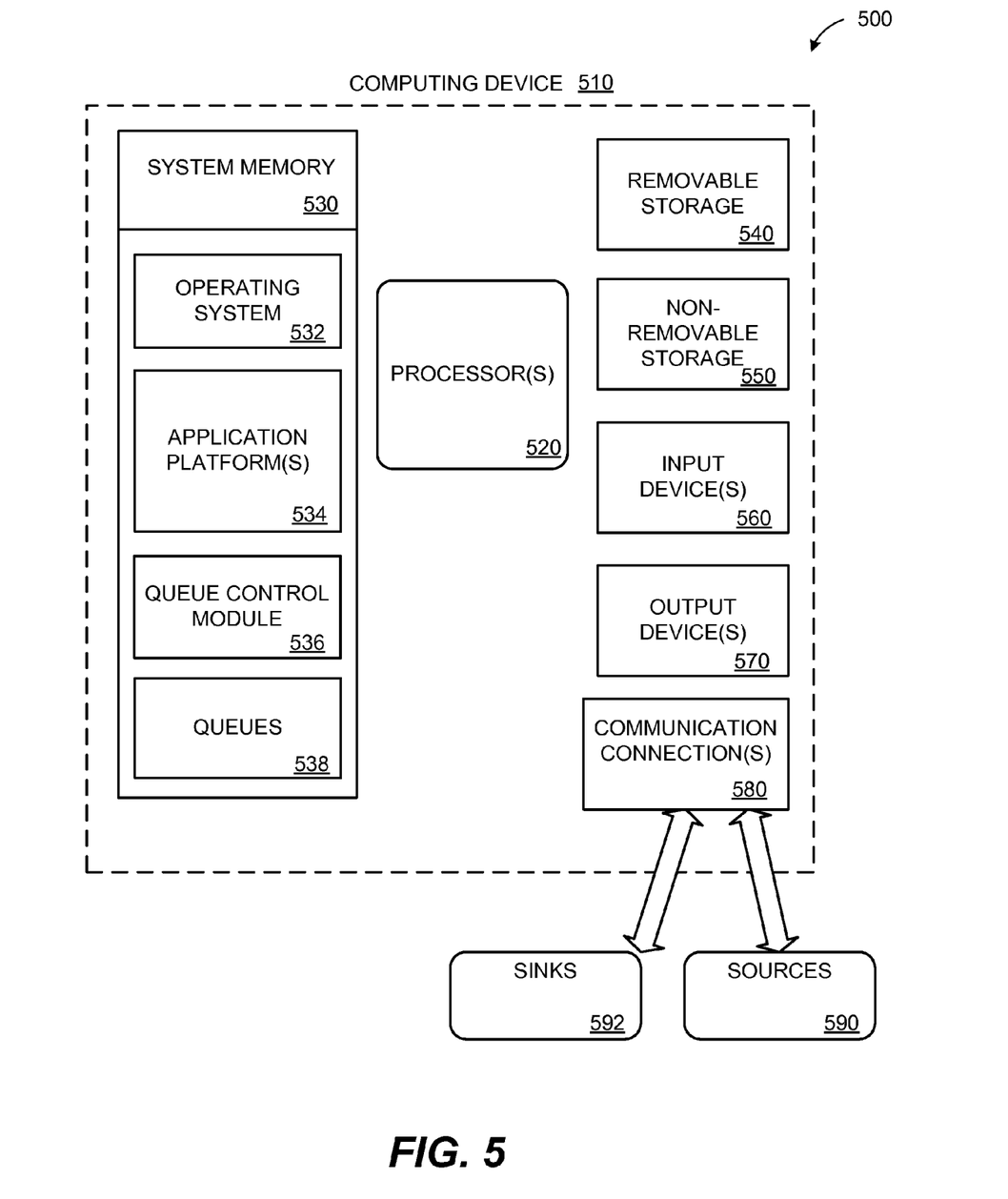
FIG. 5 is a block diagram of a computing environment including a computing device operable to support embodiments of computer-implemented methods, computer program products, and system components as illustrated in FIGS. 1-4.

FIG. 5 depicts a block diagram of a computing environment 500 including a computing device 510 operable to support embodiments of computer-implemented methods, computer program products, and system components according to the present disclosure. In an illustrative embodiment, the computing device 510 may include one or more of the interfaces 106, 118 of FIG. 1, the queue control module 108 of FIG. 1, the adapters 210, 230 of FIG. 2, and the query engine 220 of FIG. 2. Each of the interfaces 106, 118 of FIG. 1, the queue control module 108 of FIG. 1, the adapters 210, 230 of FIG. 2, and the query engine 220 of FIG. 2 may include or be implemented using the computing device 510 or a portion thereof.

The computing device 510 includes at least one processor 520 and a system memory 530. Depending on the configuration and type of computing device, the system memory 530 may be volatile (such as random access memory or "RAM"), non-volatile (such as flash memory and similar memory devices that maintain stored data even when power is not provided), or some combination of the two. The system memory 530 typically includes an operating system 532, one or more application platforms 534, one or more applications (e.g., a queue control module 536), and may include program data (e.g., queues 538) associated with the one or more applications. In an illustrative embodiment, the queue control module 536 is the module 108 of FIG. 1, or the module 222 of FIG. 2. In another illustrative embodiment, the queues 538 include the queues 114-115 of FIG. 1 or the queues 212, 224 of FIG. 2.

The computing device 510 may also have additional features or functionality. For example, the computing device 510 may also include removable and/or non-removable additional data storage devices such as magnetic disks, optical disks, tape, and standard-sized or miniature flash memory cards. Such additional storage is illustrated in FIG. 5 by removable storage 540 and non-removable storage 550. Computer storage media may include volatile and/or non-volatile storage and removable and/or non-removable media implemented in any method or technology for storage of information such as computer-readable instructions, data structures, program components or other data. The system memory 530, the removable storage 540 and the non-removable storage 550 are all examples of computer storage media. The computer storage media includes, but is not limited to, RAM, ROM, electrically erasable programmable read-only memory (EEPROM), flash memory or other memory technology, compact disks (CD), digital versatile disks (DVD) or other optical storage, magnetic cassettes, magnetic tape, magnetic disk storage or other magnetic storage devices, or any other medium that can be used to store information and that can be accessed by the computing device 510. Any such computer storage media may be part of the computing device 510. The computing device 510 may also have input device(s) 560, such as a keyboard, mouse, pen, voice input device, touch input device, etc. Output device(s) 570, such as a display, speakers, printer, etc. may also be included.

The computing device 510 also contains one or more communication connections 580 that allow the computing device 510 to communicate with other computing devices (e.g., sources 590 and sinks 592) over a wired or a wireless network. In an illustrative embodiment, the communication connections 580 include the interfaces 106, 118 of FIG. 1 or the adapters 210, 230 of FIG. 2. In another illustrative embodiment, the sources 590 include the source 102 of FIG. 1 or the source 202 of FIG. 2. In another illustrative embodiment, the sinks 592 include the sink 122 of FIG. 1 or the sink 240 of FIG. 2. It should be noted that although the sources 590 and the sinks 592 are illustrated as communicatively coupled to the communications connections 580, the sources 590 and the sinks 592 may communicate with the computing device 510 via other mechanisms. For example, the sources 590 and the sinks 592 may be local to the computing device 510 and stored at the removable storage 540 or the non-removable storage 550.

It will be appreciated that not all of the components or devices illustrated in FIG. 5 or otherwise described in the previous paragraphs are necessary to support embodiments as herein described. For example, the input device(s) 560 and output device(s) 570 may be optional.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Those of skill would further appreciate that the various illustrative logical blocks, configurations, modules, and process or instruction steps described in connection with the embodiments disclosed herein may be implemented as electronic hardware, computer software, or combinations of both. Various illustrative components, blocks, configurations, modules, or steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method described in connection with the embodiments disclosed herein may be embodied directly in hardware, in a software module executed by a processor, or in a combination of the two. A software module may reside in computer readable media, such as random access memory (RAM), flash memory, read only memory (ROM), registers, a hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor or the processor and the storage medium may reside as discrete components in a computing device or computer system.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The previous description of the embodiments is provided to enable a person skilled in the art to make or use the embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A computer-implemented method of operating a complex event processing (CEP) adapter, the method comprising:
    initiating the CEP adapter based on an adapter factory class that includes data common to two or more of a point event model, an interval event model, and an edge event model;
    receiving a start message at the CEP adapter;
    executing a running state at the CEP adapter in response to the start message;
    during execution of the running state, receiving an event object from a source;
    attempting to execute a queue operation with respect to the event object;
    when the queue operation is successful, remaining in the running state;
    when the queue operation is unsuccessful, entering a suspended state, wherein the CEP adapter is configured to not perform the queue operation during the suspended state;
    receiving a resume message while in the suspended state; and
    terminating the suspended state and re-executing the running state in response to the resume message.

2. The computer-implemented method of claim 1, wherein the CEP adapter is a CEP input adapter.

3. The computer-implemented method of claim 2, wherein the CEP adapter is a CEP output adapter.

4. The computer-implemented method of claim 1, wherein the queue operation is one of an enqueue operation that inserts the event object into a queue and a dequeue operation that retrieves the event object from the queue.

5. The computer-implemented method of claim 1, wherein instantiating the adapter includes configuring the adapter based on an extensible markup language (XML) serializable configuration scheme.

6. One or more computer storage media not consisting of a propagated data signal and having computer-executable components providing a method of operating a complex event processing (CEP) adapter, the method comprising:
- initiating the CEP adapter based on an adapter factory class that includes data common to two or more of a point event model, an interval event model, and an edge event model;
- receiving a start message at the CEP adapter;
- executing a running state at the CEP adapter in response to the start message;
- during execution of the running state, receiving an event object from a source;
- attempting to execute a queue operation with respect to the event object;
- when the queue operation is successful, remaining in the running state;
- when the queue operation is unsuccessful, entering a suspended state, wherein the CEP adapter is configured to not perform the queue operation during the suspended state;
- receiving a resume message while in the suspended state; and
- terminating the suspended state and re-executing the running state in response to the resume message.

7. The one or more computer storage media of claim 6, wherein the CEP adapter is a CEP input adapter.

8. The one or more computer storage media of claim 7, wherein the CEP adapter is a CEP output adapter.

9. The one or more computer storage media of claim 6, wherein the queue operation is one of an enqueue operation that inserts the event object into a queue and a dequeue operation that retrieves the event object from the queue.

10. The one or more computer storage media of claim 6, wherein instantiating the adapter includes configuring the adapter based on an extensible markup language (XML) serializable configuration scheme.

11. A computer implemented system comprising:
- a processor; and
- a memory communicatively coupled to the processor, the memory having computer-executable instructions that when executed by the processor, provide a method of operating a complex event processing (CEP) adapter, the method comprising:
  - initiating the CEP adapter based on an adapter factory class that includes data common to two or more of a point event model, an interval event model, and an edge event model;
  - receiving a start message at the CEP adapter;
  - executing a running state at the CEP adapter in response to the start message;
  - during execution of the running state, receiving an event object from a source;
  - attempting to execute a queue operation with respect to the event object;
  - when the queue operation is successful, remaining in the running state;
  - when the queue operation is unsuccessful, entering a suspended state, wherein the CEP adapter is configured to not perform the queue operation during the suspended state;
  - receiving a resume message while in the suspended state; and
  - terminating the suspended state and re-executing the running state in response to the resume message.

12. The computer implemented system of claim 11, wherein the CEP adapter is a CEP input adapter.

13. The computer implemented system of claim 12, wherein the CEP adapter is a CEP output adapter.

14. The computer implemented system of claim 11, wherein the queue operation is one of an enqueue operation that inserts the event object into a queue and a dequeue operation that retrieves the event object from the queue.

15. The computer implemented system of claim 11, wherein instantiating the adapter includes configuring the adapter based on an extensible markup language (XML) serializable configuration scheme.

* * * * *